(12) United States Patent
Zhang et al.

(10) Patent No.: US 10,934,499 B2
(45) Date of Patent: Mar. 2, 2021

(54) INTERNALLY SELF-CIRCULATING FLUIDIZED BED GASIFIER AND AIR DISTRIBUTOR THEREIN FOR GENERATING STEPPED CONSTRAINED WIND

(71) Applicant: Zhongkejuxin Clean Energy & Hot Forging Equipment Research and Development Co., Ltd, Jiangsu (CN)

(72) Inventors: Lianhua Zhang, Yancheng (CN); Baijin Chen, Yancheng (CN); Ji Wang, Yancheng (CN); Hui Zhang, Yancheng (CN); Yunlong Qiu, Yancheng (CN)

(73) Assignee: ZHONGKEJUXIN CLEAN ENERGY & HOT FORGING EQUIPMENT RESEARCH AND DEVELOPMENT CO., LTD, Jiangsu (CN)

(*) Notice: Subject to any disclaimer, the term of this patent is extended or adjusted under 35 U.S.C. 154(b) by 73 days.

(21) Appl. No.: 16/490,557

(22) PCT Filed: Jun. 13, 2017

(86) PCT No.: PCT/CN2017/088042
§ 371 (c)(1),
(2) Date: Sep. 1, 2019

(87) PCT Pub. No.: WO2018/157502
PCT Pub. Date: Sep. 7, 2018

(65) Prior Publication Data
US 2020/0071628 A1 Mar. 5, 2020

(30) Foreign Application Priority Data

Mar. 1, 2017 (CN) .......................... 201710116272.1
Mar. 1, 2017 (CN) .......................... 201710116686.4

(51) Int. Cl.
*C10J 3/84* (2006.01)
*C01B 3/02* (2006.01)
*C10J 3/56* (2006.01)

(52) U.S. Cl.
CPC .................. *C10J 3/84* (2013.01); *C01B 3/02* (2013.01); *C10J 3/56* (2013.01); *C10J 2300/09* (2013.01);
(Continued)

(58) Field of Classification Search
CPC ... C10J 3/84; C10J 3/56; C10J 2300/09; C10J 2300/0936; C10J 2300/0956;
(Continued)

(56) References Cited

U.S. PATENT DOCUMENTS 2,702,744 A * 2/1955 Totzek ..................... C10J 3/485
48/206
4,400,181 A * 8/1983 Snell ......................... C10J 3/54
48/197 R
(Continued)

FOREIGN PATENT DOCUMENTS

CA          1095876 A    2/1981
CN       201261774 Y    6/2009
(Continued)

OTHER PUBLICATIONS

European Patent Office, Supplementary European Search Report for EP Patent Application No. 17898809.3, dated Oct. 16, 2019.
(Continued)

*Primary Examiner* — Matthew J Merkling
(74) *Attorney, Agent, or Firm* — Han IP PLLC; Andy M. Han

(57) ABSTRACT

The present disclosure provides an internally self-circulating fluidized bed gasifier and an air distributor therein for generating a stepped constrained wind. The air distributor
(Continued)

includes a gas-material mixture through hole and a plurality of vent holes. Each of the vent holes is designed to have a winding path. Due to the winding paths of the vent holes and an arrangement of converging outlets of the vent holes to the gas-material mixture through hole, which is in communication with a furnace chamber, the present disclosure enables a gas entering the furnace chamber to form a stepped constrained wind and effectively prevents solid-phase materials in the furnace chamber from leaking into a gas mixture chamber. The internally self-circulating fluidized bed gasifier can achieve self-circulation combustion gasification for multiple times and a well-controlled gasification temperature, resulting in a high coal gasification efficiency without an ash leakage.

15 Claims, 1 Drawing Sheet

(52) U.S. Cl.
CPC ............... *C10J 2300/0936* (2013.01); *C10J 2300/0956* (2013.01); *C10J 2300/1631* (2013.01)

(58) Field of Classification Search
CPC .......... C10J 2300/1631; C10J 2200/152; C10J 3/506; C10J 3/503; C01B 3/02
See application file for complete search history.

(56) References Cited

U.S. PATENT DOCUMENTS

| | | | | |
|---|---|---|---|---|
| 7,578,981 | B2* | 8/2009 | Pawlak | B01F 3/02 |
| | | | | 422/129 |
| 9,150,801 | B2* | 10/2015 | Stevenson | C10J 3/506 |
| 2006/0147853 | A1* | 7/2006 | Lipp | B01J 4/002 |
| | | | | 431/8 |
| 2011/0217661 | A1* | 9/2011 | Van Der Ploeg | F23D 1/00 |
| | | | | 431/160 |
| 2012/0222592 | A1* | 9/2012 | Boer | F23D 14/78 |
| | | | | 110/263 |
| 2013/0160856 | A1* | 6/2013 | Venkatesan | C10J 3/506 |
| | | | | 137/1 |
| 2013/0192137 | A1* | 8/2013 | Stevenson | C10J 3/723 |
| | | | | 48/61 |

FOREIGN PATENT DOCUMENTS

| | | |
|---|---|---|
| CN | 201539855 U | 8/2010 |
| CN | 206494911 U A1 | 9/2017 |
| CN | 106753580 B A1 | 4/2018 |
| CN | 106753581 B A1 | 4/2018 |

OTHER PUBLICATIONS

State Intellectual Property Office, First Office Action for Chinese Patent Application No. 201710116272.1, dated Dec. 8, 2017.
State Intellectual Property Office, First Office Action for Chinese Patent Application No. 201710116686.4, dated Dec. 8, 2017.

* cited by examiner

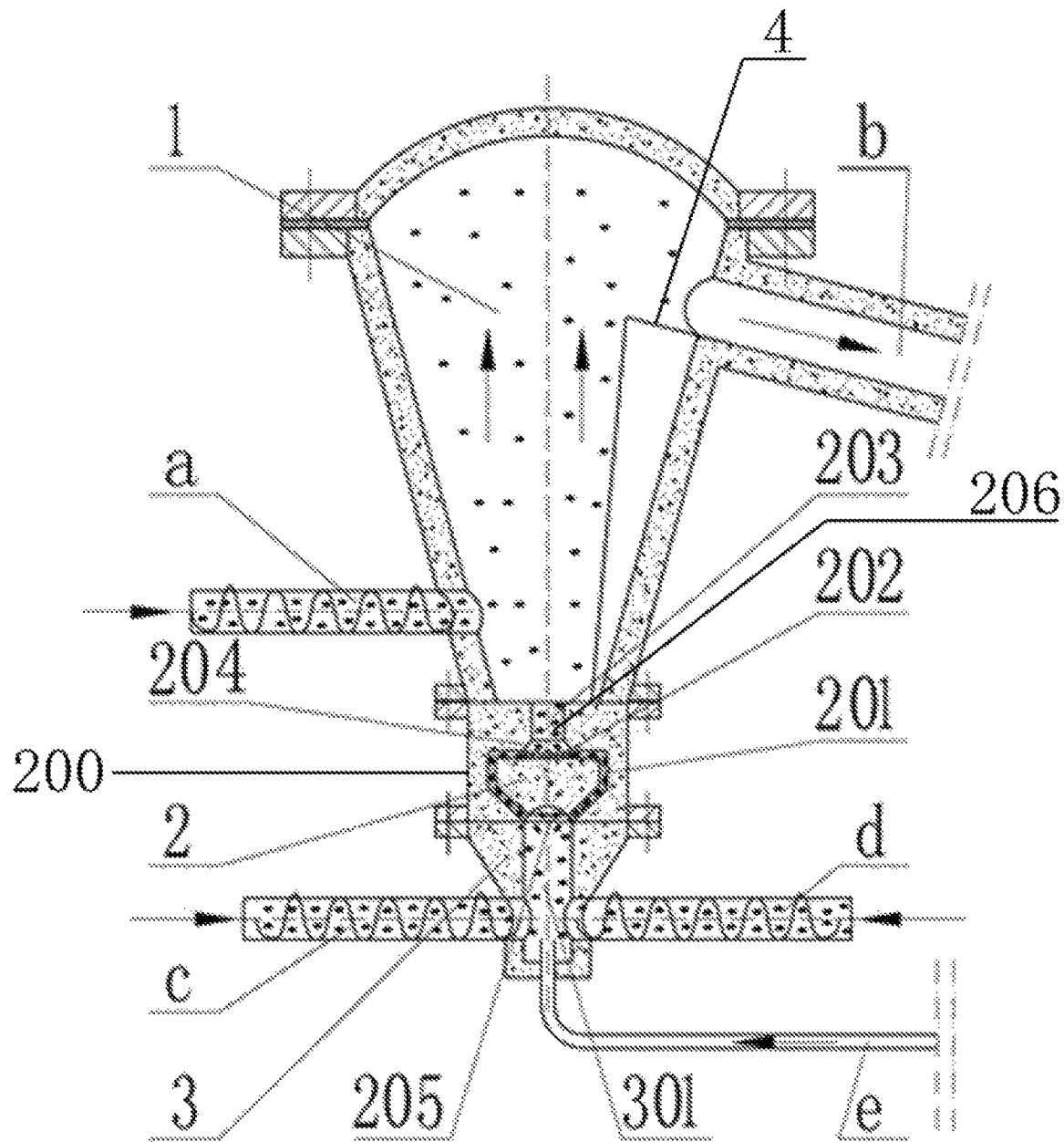

INTERNALLY SELF-CIRCULATING FLUIDIZED BED GASIFIER AND AIR DISTRIBUTOR THEREIN FOR GENERATING STEPPED CONSTRAINED WIND

CROSS-REFERENCE TO RELATED APPLICATION

This application is the U.S. national stage application of International Application No. PCT/CN2017/088042, filed on Jun. 13, 2017, which claims the priority benefit of China Patent Application No. 201710116272.1, and 201710116686.4, both filed on Mar. 1, 2017. The above-identified patent applications are hereby incorporated by reference in their entirety.

TECHNICAL FIELD

The present disclosure relates to the technical field of gasifier technologies, and particularly to an internally self-circulating fluidized bed gasifier including an air distributor therein for generating a stepped constrained wind, a special-purpose component of a coal gasification apparatus.

BACKGROUND

With the continuous progression of the society, thermal energy is increasingly needed. Traditionally, thermal energy is mostly acquired by direct coal burning, which nevertheless results in a large number of contaminants, greatly affecting people's living environment. Therefore, Chinese government has in recent years issued a large number of documents on prohibiting obtaining thermal energy from direct coal burning. To this end, a variety of gasifiers aimed to convert raw coal to coal gas have been designed, so that energy may be obtained by burning coal gas converted from raw coal. Gasifiers for producing coal gas such as a fixed bed and a circulating fluidized bed have to some extent reduced pollution of burning to the environment. However, when closely examined, each gasifier has its own advantages and disadvantages. For example, the fixed bed gasifier has a high coal conversion rate and a high thermal efficiency, but the generated coal gas contains a large number of contaminants such as tar. The circulating fluidized bed gasifier can produce clean coal gas that does not contain contaminants such as tar, but the thermal efficiency of raw coal is low; the coal slag contains a large amount of semi-coke, and the coke-containing coal slag needs to be transported to a burning environment with low requirements for re-burning, e.g., used as a raw material for a thermal power plant. To solve the above problems, a combined gasifier has been designed that combines a circulating fluidized bed and a pyrolysis gasification bed in one apparatus, which not only is free from generating contaminants such as tar during burning and gasification, but also is able to substantially increase an efficiency of coal burning and gasification. This design has two shortcomings: the first shortcoming is that a gasification temperature within a furnace chamber of the circulating fluidized bed is hardly ensured due to a decrease in the number of circulations in the circulating fluidized bed, and thus a burning temperature cannot be achieved at which no tar is generated from bulky coal briquettes; the second shortcoming is that no de-slagging means is provided at the bottom of the furnace chamber of the circulating fluidized bed, so non-coal substances with relatively high mass tend to stay at the bottom of the gasifier.

Therefore, there is a need for a new technical solution to solve the aforementioned problems.

SUMMARY

This section is for the purpose of summarizing some aspects of the present disclosure and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present disclosure.

A first objective of the present disclosure is to provide an internally self-circulating fluidized bed gasifier, which can achieve self-circulation combustion gasification for multiple times within the gasifier and has advantages such as a well-controlled gasification temperature within the gasifier, a high coal gasification efficiency, and no ash leakage.

A second objective of the present disclosure is to provide an air distributor for generating a stepped constrained wind for a circulating fluidized bed gasifier. By providing arrangement of winding paths of the vent holes of the air distributor and converging the outlets of the vent holes to a through hole having a larger diameter, the air distributor enables a gas entering the gasifier to form a stepped constrained wind and effectively prevents solid-phase materials in a furnace chamber from leaking into a gas mixture chamber.

According to one aspect of the present disclosure, an air distributor for generating a stepped constrained wind in a circulating fluidized bed gasifier is provided. The air distributor includes an air distributor body, a gas-material mixture through hole located within the air distributor body, and a plurality of vent holes located within the air distributor body. The gas-material mixture through hole extends from a top surface of the air distributor body towards a center of the air distributor body. Each vent hole has an outlet that is in communication with a bottom portion of the gas-material mixture through hole, whereas each vent hole also has an inlet that is located at a bottom surface of the air distributor body. In addition, each vent hole is designed to have a winding path between the inlet and the outlet.

In some embodiments, the gas-material mixture through hole may include a cylindrical hole, as well as a hollow frustum tapering from bottom to top. An upper end of the cylindrical hole is located at the top surface of the air distributor body, whereas a bottom end of the cylindrical hole is connected to an upper edge of the hollow frustum. The hollow frustum, serving as a connection portion of the gas-material mixture through hole, is in communication with the outlet of each of the plurality of vent holes.

In some embodiments, the hollow frustum may be provided as a sealing cap. A bottom of the gas-material mixture through hole may have a flat surface which is provided as a material blocking platform. In some embodiments, the bottom surface of the air distributor may be a spherical arch face recessed towards the center of the air distributor body.

In some embodiments, each vent hole may include a diverging section, a vertical section, and a horizontal section. The sections are connected in sequence from the inlet to the outlet of the vent hole. In some alternative embodiments, each vent hole may include just a diverging section and a horizontal section connected in sequence.

In some embodiments, an inclination of each of the various sections of a vent hole (i.e., the diverging section, the vertical section, or the horizontal section) is designed according to a requirement of a gas throughput, a requirement of a gas speed, or a parameter of solid-phase particles in a gasifier in which the air distributor is located. The parameter may be a deposition speed, a diameter, or a density of the solid-phase particles.

According to one aspect of the present disclosure, an internally self-circulating fluidized bed gasifier is provided. The internally self-circulating fluidized bed gasifier includes a gasifier body and a furnace inner chamber enclosed by the gasifier body. The furnace inner chamber includes a furnace chamber provided at an upper part thereof, and an air distributor provided below the furnace chamber. The internally self-circulating fluidized bed gasifier further includes a gas mixture chamber provided below the air distributor. The air distributor for generating a stepped constrained wind includes an air distributor body, a gas-material mixture through hole located within the air distributor body, and a plurality of vent holes located within the air distributor body. The gas-material mixture through hole extends from a top surface of the air distributor body towards a center of the air distributor body. Each vent hole has an outlet that is in communication with a bottom portion of the gas-material mixture through hole, whereas each vent hole also has an inlet that is located at a bottom surface of the air distributor body. In addition, each vent hole is designed to have a winding path between the inlet and the outlet. The gas-material mixture through hole is in communication with a bottom port of the furnace chamber. Also, the inlets of the vent holes are in communication with the gas mixture chamber.

In some embodiments, the gas-material mixture through hole is designed to be aligned with a center of the bottom port of the furnace chamber. The furnace chamber is designed to be an inverted frustum structure that tapers from top to bottom. Also, the gas mixture chamber is configured for a pre-burning process.

In some embodiments, the internally self-circulating fluidized bed gasifier further includes a coal transport pipe provided in the middle of the furnace chamber and a high temperature gas-material pipe provided at an upper part of the furnace chamber. In particular, the coal transport pipe is in communication with the furnace chamber. An inlet of the high temperature gas-material pipe is in communication with the furnace chamber, and an outlet of the high temperature gas-material pipe is in communication with a subsequent device.

In some embodiments, the internally self-circulating fluidized bed gasifier further includes a material guiding platform. The material guiding platform is provided within the furnace chamber and located at the inlet of the high temperature gas-material pipe. Specifically, a surface of the material guiding platform faces upward. An upper surface of the material guiding platform is an arc surface, and the arc surface is connected to a lower part of an inner wall of the high temperature gas-material pipe so that materials within the furnace chamber that fall on the material guiding platform can smoothly enter the subsequent device along the inner wall of the high temperature gas-material pipe.

In some embodiments, a high temperature gas-material mixture generated from the pre-burning process within the gas mixture chamber is configured to enter the plurality of vent holes via the inlets of the plurality of vent holes. The gas-material mixture is then configured to enter the gas-material mixture through hole via the outlets of the plurality of vent holes for bundling and rushing to the furnace chamber. The gas-material mixture is then configured to form a flow of a stepped constrained wind as the gas-material mixture enters the furnace chamber, the flow having a higher flow rate in the middle of the flow and a lower flow rate at the periphery of the flow. Moreover, the gas-material mixture is then configured to form an internal circulation in the furnace chamber, the internal circulation comprising a constrained gas stream that flows upwardly in a middle portion of the internal circulation and a peripheral gas stream that overflows downwardly at a peripheral of the internal circulation.

In some embodiments, the internally self-circulating fluidized bed gasifier further includes a gasification agent pipe. The gasification agent pipe is in communication with the gas mixture chamber and configured to introduce a gasification agent to the gas mixture chamber.

In some embodiments, the internally self-circulating fluidized bed gasifier further includes either or both of a pulverized coal transport pipe and a carbon-containing fly ash transport pipe. Both the pulverized coal transport pipe and the carbon-containing fly ash transport pipe are in communication with the gas mixture chamber. Specifically, the pulverized coal transport pipe is configured to transport a pulverized coal to the gas mixture chamber, and the carbon-containing fly ash transport pipe is configured to transport a carbon-containing fly ash to the gas mixture chamber. Moreover, the high temperature gas-material mixture may include the gasification agent as well as a coal gas that is generated from pre-burning of the gasification agent, the carbon-containing fly ash and the pulverized coal in the pre-burning process. The coal gas may include a high temperature carbon-containing fly ash.

In some embodiments, the gas-material mixture through hole may include a cylindrical hole, as well as a hollow frustum tapering from bottom to top. An upper end of the cylindrical hole is located at the top surface of the air distributor body, whereas a bottom end of the cylindrical hole is connected to an upper edge of the hollow frustum. The hollow frustum, serving as a connection portion of the gas-material mixture through hole, is in communication with the outlet of each of the plurality of vent holes.

In some embodiments, the hollow frustum may be provided as a sealing cap. A bottom of the gas-material mixture through hole may have a flat surface which is provided as a material blocking platform. In some embodiments, the bottom surface of the air distributor may be a spherical arch face recessed towards the center of the air distributor body.

In some embodiments, each vent hole may include a diverging section, a vertical section, and a horizontal section. The sections are connected in sequence from the inlet to the outlet of the vent hole. In some alternative embodiments, each vent hole may include just a diverging section and a horizontal section connected in sequence.

Compared to existing technologies, the air distributor according to one aspect of the present disclosure is able to generate a stepped constrained wind, mostly due to the winding path of each of the vent holes, as well as an arrangement of converging the outlets of the vent holes in the through hole that has a relatively larger diameter. Consequently, the gas entering the gasifier is in a form of the stepped constrained wind, which effectively prevents solid-phase materials in the furnace chamber from leaking into the gas mixture chamber. Through adopting the design of the furnace chamber that has an inverted frustum structure tapering from top to bottom, as well as the design of the air distributor that generates a high flow rate in the middle of the stepped constrained wind, the internally self-circulating fluidized bed gasifier in the present disclosure realizes an internal circulation within the furnace chamber, which ensures the gasification temperature within the furnace chamber. Consequently, the internally self-circulating fluidized bed gasifier of the present disclosure achieves self-circulation combustion gasification for multiple times within the gasifier and provides advantages such as a well-controlled gasification temperature within the gasifier, a high coal gasification efficiency, and no ash leakage.

BRIEF DESCRIPTION OF THE DRAWINGS

To illustrate the technical solutions of embodiments of the present disclosure more clearly, a brief introduction to the accompanying drawings required to describe the embodiments is given below. Obviously, the accompanying drawings in the description below are merely some embodiments of the present disclosure, based on which other drawings may also be obtained by a person of ordinary skill in the art without any inventive efforts. In the drawings:

FIG. 1 is a schematic longitudinal sectional view showing an internally self-circulating fluidized bed gasifier according to one embodiment of the present disclosure.

In FIG. 1: 1 denotes a furnace chamber; 2 denotes an air distributor for generating a stepped constrained wind; 3 denotes a pre-burning device; 201 denotes a plurality of vent holes; 202 denotes a material blocking platform; 203 denotes a gas-material mixture through hole; 204 denotes a sealing cap; 205 denotes a spherical arch face; 206 denotes a cylindrical hole; 301 denotes a gas mixture chamber; 4 denotes a material guiding platform; a denotes a coal transport pipe; b denotes a high temperature gas-material pipe; c denotes a pulverized coal transport pipe; d denotes a carbon-containing fly ash transport pipe; e denotes a gasification agent pipe.

DETAILED DESCRIPTION OF THE PREFERRED EMBODIMENTS

The detailed description of the present disclosure is presented largely in terms of procedures, steps, logic blocks, processing, or other symbolic representations that directly or indirectly resemble the operations of devices or systems contemplated in the present disclosure. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the present disclosure. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the present disclosure do not inherently indicate any particular order nor imply any limitations in the present disclosure.

To make the above object, features and advantages of the present disclosure clearer and easier to understand, the present disclosure will be further described in detail below in connection with the accompanying drawings and particular implementations.

"One embodiment" or "embodiment" herein means a specific feature, structure or characteristic that may be included in at least one implementation of the present disclosure. "In one embodiment" throughout the specification refers to neither the same embodiment, nor a separate or optional embodiment contradictory to other embodiments. Unless especially stated, terms indicating a connection such as connected, linked and joined all refer to a direct or indirect connection.

One of the ways to mitigate the first shortcoming mentioned in the Background section above is to repeatedly self-circulate, burn and gasify coal in the circulating fluidized bed gasifier. To achieve this purpose, it is required that a gas, or a gas-material mixture, that enters the furnace chamber of the gasifier be a stepped constrained wind that is non-uniform, so that an internal circulation can be generated. However, existing air distributors are intended to uniformly introduce a gas from a gas chamber to a furnace chamber of the gasifier, such that the gas entering the furnace chamber of the gasifier is uniform throughout the gasifier. In addition, traditional air distributors have a relatively serious ash leakage problem due to an unreasonable arrangement of a gas cap, which results in blockage of a gas chamber.

Another way to mitigate the first shortcoming mentioned in the Background section above is to heat or pre-burn a gasification agent entering the circulating fluidized bed, such that a large amount of heat can be brought to the furnace chamber to increase a gasification temperature within the furnace chamber. A way to mitigate the second shortcoming mentioned in the Background section above is to design a differentiated air distributor. Therefore, for a newly designed combined gasifier that comprises a circulating fluidized bed and a pyrolysis gasification bed to work properly, it is a must to design a gasifier that can cause repeated self-circulation, burning and gasification within the furnace chamber. Additionally, it is necessary to design an air distributor that is capable of generating a stepped constrained wind that matches the gasifier.

Refer to FIG. 1, which illustrates a schematic longitudinal sectional view of an internally self-circulating fluidized bed gasifier according to one embodiment of the present disclosure. The internally self-circulating fluidized bed gasifier as shown in FIG. 1 includes a gasifier body (not numerally labeled) and a furnace inner chamber (not numerally labeled) enclosed by the gasifier body. For example, the gasifier body may be a housing, wherein the furnace inner chamber may be a cavity enclosed by the housing. The furnace inner chamber includes a furnace chamber 1 provided at an upper part of the furnace inner chamber. The furnace inner chamber also includes an air distributor 2 provided below the furnace chamber 1, wherein the air distributor 2 is configured to generate a stepped constrained wind. The internally self-circulating fluidized bed gasifier further includes a gas mixture chamber 301 provided below the air distributor 2. A top surface of the air distributor 2 covers a bottom port of the furnace chamber 1, and a bottom surface of the air distributor 2 serves as a top of the gas mixture chamber 301.

Firstly, the furnace chamber 1 is described below. A coal transport pipe a is provided in a middle portion of the furnace chamber 1 and is in communication with the furnace chamber 1. A high temperature gas-material pipe b is provided in an upper portion of the furnace chamber 1. An inlet of the high temperature gas-material pipe b is in communication with the furnace chamber 1, and an outlet of the high temperature gas-material pipe b is in communication with a subsequent device (not shown). The furnace chamber 1 may be a structure tapering from top to bottom. In the embodiment as shown in FIG. 1, the furnace chamber 1 is an inverted frustum structure tapering from top to bottom. A top of the furnace chamber 1 is a spherical cap structure that is concave or recessed upwardly. Reasons of various designs in the shape of the furnace chamber 1 are described in a later part of the present disclosure.

A material guiding platform 4 is provided within the furnace chamber 1 at the inlet of the high temperature gas-material pipe b. In the embodiment shown in FIG. 1, a surface of the material guiding platform 4 faces upward. An upper surface of the material guiding platform 4 is an arc surface, which is connected to a lower part of an inner wall of the high temperature gas-material pipe b. As a result, materials within the furnace chamber 1 that fall on the material guiding platform 4 can smoothly enter the subsequent device along the inner wall of the high temperature gas-material pipe b. In one preferred embodiment, a longitudinal cross section of the material guiding platform 4 takes the shape of a part of a ring.

Secondly, the air distributor 2 is described below, which is capable of generating a stepped constrained wind. The air distributor 2 includes an air distributor body 200, a gas-material mixture through hole 203, and a plurality of vent holes 201. The gas-material mixture through hole 203 and the plurality of vent holes 201 are located within the air distributor body 200. The gas-material mixture through hole 203 extends from a top surface of the air distributor body 200 towards a center of the air distributor body 200. The top surface of the air distributor body 200 may also be referred to as a top surface of the air distributor 2. The gas-material mixture through hole 203 is in communication with the bottom port of the furnace chamber 1. Specifically, the gas-material mixture through hole 203 is aligned with a center of the bottom port of the furnace chamber 1. Each of the plurality of vent holes 201 has an outlet that is in communication with a bottom portion of the gas-material mixture through hole 203. Each of the plurality of vent holes 201 has an inlet that is located at a bottom surface of the air distributor body 200 and in communication with the gas mixture chamber 301. The bottom surface of the air distributor body 200 may also be referred as a bottom surface of the air distributor 2. Each of the plurality of vent holes 201 is designed to have a winding path.

In the embodiment shown in FIG. 1, the gas-material mixture through hole 203 includes a cylindrical hole 206 and a hollow frustum 204 tapering from bottom to top. An upper end of the cylindrical hole 206 is located at the top surface of the air distributor body 200, and a bottom end of the cylindrical hole 206 is connected to an upper edge of the frustum 204. The hollow frustum 204, serving as a connection portion of the gas-material mixture through hole 203, is in communication with the outlet of each of the plurality of vent holes 201. In some embodiments, the frustum 204 may be provided as a sealing cap. A bottom of the gas-material mixture through hole 203 comprises a flat surface, which is provided as a material blocking platform 202. In the embodiment shown in FIG. 1, the bottom surface of the air distributor 2 is a spherical arch face 205, which is recessed upwardly. That is, the bottom surface of the air distributor 2 is a spherical arch face that is recessed towards the center of the air distributor body 200. Namely, the top of the gas mixture chamber 301 is the spherical arch face 205 that is recessed upwardly.

In the embodiment shown in FIG. 1, each of the plurality of vent holes 201 includes a diverging section, a vertical section, and a horizontal section that are connected in sequence from the inlet of the respective vent hole 201 to the outlet of the respective vent hole 201. In an alternative embodiment, a vent hole 201 may include a diverging section and a horizontal section connected in sequence from the inlet thereof to the outlet thereof. That is, each of the vent holes 201 according to the present disclosure only need to be designed to have a winding path. In any embodiment, an inclination of each of the various sections (i.e., the diverging section, the vertical section, or the horizontal section) of a vent hole 201 may be designed according to requirements such as a gas throughput and/or a gas speed. The inclination may also be designed based on various parameters of solid-phase particles in the gasifier in which the air distributor 2 is located, such as a deposition speed, a diameter, and/or a density of the solid-phase particles.

Finally, the gas mixture chamber 301 is described below. In the embodiment shown in FIG. 1, a pulverized coal transport pipe c and a carbon-containing fly ash transport pipe d are provided in a middle portion of the gas mixture chamber 301. The pulverized coal transport pipe c and the carbon-containing fly ash transport pipe d are in communication with the gas mixture chamber 301. A gasification agent pipe e is provided at a bottom of the gas mixture chamber 301, and the gasification agent pipe e is in communication with the gas mixture chamber 301. The gas mixture chamber 301 is configured for a pre-burning process. That is, a gasification agent, a carbon-containing fly ash and a pulverized coal are pre-burnt in the gas mixture chamber 301. It should be specially noted that in other embodiments, only one of the pulverized coal transport pipe c and the carbon-containing fly ash transport pipe d may be provided in communication with the gas mixture chamber 301.

For ease of understanding the present disclosure, working principles of the internally self-circulating fluidized bed gasifier of the present disclosure is described in detail below in view of FIG. 1.

The pulverized coal transport pipe c and the carbon-containing fly ash transport pipe d provided in the middle portion of the gas mixture chamber 301 respectively transport a pulverized coal and a carbon-containing fly ash to the gas mixture chamber 301. The gasification agent pipe e provided at the bottom of the gas mixture chamber 301 transports a gasification agent to the gas mixture chamber 301. The pulverized coal and the carbon-containing fly ash meet the gasification agent in the gas mixture chamber 301 and are then burnt and gasified therein to generate a high temperature gas-material mixture. The high-temperature gas-material mixture then enters the furnace chamber 1 via the air distributor 2, thereby bringing a large amount of heat to the furnace chamber 1 to increase a gasification temperature in the furnace chamber 1. The high temperature gas-material mixture may include the gasification agent and a coal gas that is generated from the pre-burning process, i.e., the pre-burning of the gasification agent, the carbon-containing fly ash, and the pulverized coal in the gas mixture chamber 301. The coal gas may carry some high temperature carbon-containing fly ash.

Specifically, the gasification agent and the coal gas having the high-temperature fly ash, i.e., the high temperature gas-material mixture, may, after being generated from the pre-burning in the gas mixture chamber 301, enter the vent holes 201 via the inlets of the vent holes 201. The gas-material mixture may then enter the gas-material mixture through hole 203 via the outlets of the vent holes 201 for bundling and rushing to the furnace chamber 1 of the gasifier. Since the gas-material mixture through hole 203 has a relatively large diameter that allows a rather large amount of gas-material mixture to flow through, the gas-material mixture rushing to the furnace chamber 1 from the gas-material mixture through hole 203 exhibits different flow rates, thereby forming a flow of a stepped constrained wind with a higher flow rate in the middle of the flow and a lower flow rate at the periphery of the flow. Therefore, the stepped constrained wind comprising the gasification agent and the coal gas having the high-temperature fly ash may, after entering the furnace chamber 1, flow upwardly at a high speed within the furnace chamber 1 of the gasifier. The gasification agent and the coal gas may then be quickly burnt, pyrolyzed and gasified when meeting the coal transported to the furnace chamber 1 via the coal transport pipe a provided in the middle portion of the furnace chamber 1.

As described above, the stepped constrained wind, as it enters the furnace chamber 1, has a higher flow rate in the middle of the flow and a lower flow rate at the periphery of the flow. On top of that, the furnace chamber 1 is specially designed to have an inverted frustum structure tapering from top to bottom. Combining the stepped constrained wind with the inverted frustum structure, an internal circulation phenomenon of the gas-material mixture is resulted in the furnace chamber 1 of the gasifier. The internal circulation phenomenon realizes a repeated circulation, burning, pyrolysis and gasification of the coal in the furnace chamber 1 of the gasifier, thereby ensuring a gasification temperature within the furnace chamber 1 and increasing a coal gasification efficiency thereof. In addition, due to the stepped constrained wind resulted by the air distributor 2, a high-speed gas stream is formed in the middle of the high-temperature gas-material mixture entering the furnace chamber 1. The high-speed gas stream is able to blow upward material with a larger diameter and/or a heavier mass that would have otherwise fallen into the gas-material mixture through hole 203. After a plurality of circulations, the material would enter the high temperature gas-material pipe b and finally reach the subsequent device, thereby solving the problem in the existing circulating fluidized beds that non-coal substances, especially those with a heavier mass, tend to stay at the bottom of the gasifier.

It should be particularly noted that, in some embodiments, the air distributor 2 may be made of a non-metal refractory material that is resistant to high temperature. Also, in some embodiments, the air distributor 2 and a wall of the gasifier may be integrally structured. In some other embodiments, the air distributor 2 and the wall of the gasifier may be separately formed and then bonded together.

To sum up, the gas mixture chamber 301 provided in the present disclosure can heat or pre-burn the gasification agent entering the circulating fluidized bed, thereby bringing a large amount of heat to the furnace chamber 1 to increase the gasification temperature within the furnace chamber 1. By arranging the vent holes 201 of the air distributor 2 to have winding paths and converging the outlets of the vent holes 201 to a same channel having a larger diameter (i.e., the gas-material mixture through hole 203), the present disclosure enables the gas or the gas-material mixture entering the furnace chamber 1 to form a stepped constrained wind, which effectively prevents solid-phase materials within the furnace chamber 1 from leaking into the gas chamber. Combining the design of the air distributor 2 and the design of the furnace chamber that adopts an inverted frustum structure tapering from top to bottom, the internally self-circulating fluidized bed gasifier in the present disclosure realizes an internal circulation within the furnace chamber 1, wherein a constrained gas stream flows upwardly in the middle of the internal circulation and a peripheral gas stream overflows downwardly at the peripheral of the internal circulation. Repeated circulation, burning, pyrolysis and gasification of the coal within the furnace chamber 1 of the gasifier are achieved, ensuring the gasification temperature within the furnace chamber 1 and increasing the coal gasification efficiency. In addition, with the design of the air distributor 2, the high-temperature gas-material mixture entering the furnace chamber 1 of the circulating fluidized bed gasifier has a high-speed gas stream in the middle of the flow, which blows upward material having a larger diameter and/or a heavier mass that would otherwise have fallen into the gas-material mixture through hole 203, so that the material would move fast upwardly with the gas stream. After a plurality of circulations, the material would enter the high temperature gas-material pipe b and finally reach the subsequent device via the high temperature gas-material pipe b.

In the present disclosure, unless especially stated, terms indicating a connection such as "connected", "joined", "linked" and "coupled" indicate a direct or indirect connection.

It should be noted that any modification made by a person skilled in the art to a specific implementation of the present disclosure does not depart from the scope of the claims of the present disclosure. Accordingly, the scope of the claims of the present disclosure is not merely limited to the specific implementations mentioned above.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. An air distributor, comprising:
an air distributor body;
a gas-material mixture through hole located within the air distributor body; and
a plurality of vent holes located within the air distributor body,
wherein:
the gas-material mixture through hole extends from a top surface of the air distributor body towards a center of the air distributor body,
each of the plurality of vent holes has an outlet that is in communication with a bottom portion of the gas-material mixture through hole,
each of the plurality of vent holes has an inlet that is located at a bottom surface of the air distributor body, and
each of the plurality of vent holes has a winding path extending between the inlet of the respective vent hole and the outlet of the respective vent hole.

2. The air distributor of claim 1, wherein:
the gas-material mixture through hole comprises a cylindrical hole and a hollow frustum tapering from bottom to top,
an upper end of the cylindrical hole is located at the top surface of the air distributor body,
a bottom end of the cylindrical hole is connected to an upper edge of the hollow frustum, and
the hollow frustum is in communication with the outlet of each of the plurality of vent holes.

3. The air distributor of claim 1, wherein:
the hollow frustum is provided as a sealing cap,
a bottom of the gas-material mixture through hole comprises a flat surface which is provided as a material blocking platform, and
the bottom surface of the air distributor is a spherical arch face recessed towards the center of the air distributor body.

4. The air distributor of claim 1, wherein:
the winding path of each of the plurality of vent holes includes a diverging section, a vertical section and a horizontal section that are connected in sequence, or
the winding path of each of the plurality of vent holes includes a diverging section and a horizontal section that are connected in sequence.

5. The air distributor of claim 4, wherein an inclination of each of the diverging section, the vertical section and the horizontal section is designed according to a requirement of a gas throughput, a requirement of a gas speed, or a parameter of solid-phase particles in a gasifier in which the air distributor is located, and wherein the parameter comprises a deposition speed, a diameter, or a density.

6. An internally self-circulating fluidized bed gasifier, comprising:
a gasifier body;
a furnace inner chamber enclosed by the gasifier body, the furnace inner chamber comprising:
a furnace chamber provided at an upper part of the furnace inner chamber; and
an air distributor provided below the furnace chamber; and
a gas mixture chamber provided below the air distributor, wherein:
the air distributor comprises:
an air distributor body;
a gas-material mixture through hole located within the air distributor body; and
a plurality of vent holes located within the air distributor body,
the gas-material mixture through hole extends from a top surface of the air distributor body towards a center of the air distributor body,
each of the plurality of vent holes has an outlet that is in communication with a bottom portion of the gas-material mixture through hole,
each of the plurality of vent holes has an inlet that is located at a bottom surface of the air distributor body,
each of the plurality of vent holes has a winding path extending between the inlet of the respective vent hole and the outlet of the respective vent hole,
the gas-material mixture through hole is in communication with a bottom port of the furnace chamber, and
the inlet is in communication with the gas mixture chamber.

7. The internally self-circulating fluidized bed gasifier of claim 6, wherein:
the gas-material mixture through hole is aligned with a center of the bottom port of the furnace chamber,
the furnace chamber comprises an inverted frustum structure tapering from top to bottom, and
the gas mixture chamber is configured for a pre-burning process.

8. The internally self-circulating fluidized bed gasifier of claim 6, further comprising:
a coal transport pipe provided in a middle portion of the furnace chamber; and
a high temperature gas-material pipe provided in an upper portion of the furnace chamber,
wherein:
the coal transport pipe is in communication with the furnace chamber,
an inlet of the high temperature gas-material pipe is in communication with the furnace chamber, and
an outlet of the high temperature gas-material pipe is in communication with a subsequent device.

9. The internally self-circulating fluidized bed gasifier of claim 8, further comprising:
a material guiding platform provided within the furnace chamber and located at the inlet of the high temperature gas-material pipe,
wherein:
a surface of the material guiding platform faces upward,
an upper surface of the material guiding platform is an arc surface, and
the arc surface is connected to a lower part of an inner wall of the high temperature gas-material pipe.

10. The internally self-circulating fluidized bed gasifier of claim 7, wherein:
a high temperature gas-material mixture generated from the pre-burning process within the gas mixture chamber is configured to enter the plurality of vent holes via the inlets of the plurality of vent holes,
the gas-material mixture is then configured to enter the gas-material mixture through hole via the outlets of the plurality of vent holes for bundling and rushing to the furnace chamber,
the gas-material mixture is then configured to form a flow of a stepped constrained wind as the gas-material mixture enters the furnace chamber, the flow having a higher flow rate in the middle of the flow and a lower flow rate at the periphery of the flow, and
the gas-material mixture is then configured to form an internal circulation in the furnace chamber, the internal circulation comprising a constrained gas stream that flows upwardly in a middle portion of the internal circulation and a peripheral gas stream that overflows downwardly at a peripheral of the internal circulation.

11. The internally self-circulating fluidized bed gasifier of claim 10, further comprising:
a gasification agent pipe in communication with the gas mixture chamber and configured to introduce a gasification agent to the gas mixture chamber.

12. The internally self-circulating fluidized bed gasifier of claim 11, further comprising:
a pulverized coal transport pipe in communication with the gas mixture chamber; or
a carbon-containing fly ash transport pipe in communication with the gas mixture chamber,
wherein:
the pulverized coal transport pipe is configured to transport a pulverized coal to the gas mixture chamber,
the carbon-containing fly ash transport pipe is configured to transport a carbon-containing fly ash to the gas mixture chamber, and
the high temperature gas-material mixture comprises the gasification agent and a coal gas that is generated from pre-burning of the gasification agent, the carbon-containing fly ash and the pulverized coal in the pre-burning process.

13. The internally self-circulating fluidized bed gasifier of claim 6, wherein:
the gas-material mixture through hole comprises a cylindrical hole and a hollow frustum tapering from bottom to top,
an upper end of the cylindrical hole is located at the top surface of the air distributor body,
a bottom end of the cylindrical hole is connected to an upper edge of the hollow frustum, and
the hollow frustum is in communication with the outlet of each of the plurality of vent holes.

14. The internally self-circulating fluidized bed gasifier of claim 6, wherein:
the hollow frustum is provided as a sealing cap,
a bottom of the gas-material mixture through hole comprises a flat surface which is provided as a material blocking platform, and
the bottom surface of the air distributor is a spherical arch face recessed towards the center of the air distributor body.

15. The internally self-circulating fluidized bed gasifier of claim 6, wherein:
the winding path of each of the plurality of vent holes includes a diverging section, a vertical section and a horizontal section that are connected in sequence, or
the winding path of each of the plurality of vent holes includes a diverging section and a horizontal section that are connected in sequence.

* * * * *